United States Patent Office 3,458,573
Patented July 29, 1969

3,458,573
PREPARATION OF MONOCHLORO-
ACETOACETAMIDES
Charles H. Tieman, Modesto, Calif., assignor to Shell
Oil Company, New York, N.Y., a corporation of
Delaware
No Drawing. Filed July 19, 1967, Ser. No. 654,325
Int. Cl. C07c *103/02*
U.S. Cl. 260—561                                14 Claims

ABSTRACT OF THE DISCLOSURE

Preparation of N-alkyl- and N,N-dialkyl-2-chloroaceto-acetamides by reacting N-alkyl- and N,N-dialkylaceto-acetamide with chloral, chlorinating the resultant chloral adduct, and dissociating the chlorinated chloral product.

Introduction

N-alkyl and N,N-dialkyl-2-chloroacetoacetamides are intermediates in synthesizing an important class of insecticides comprising dialkyl phosphates of 3-hydroxycrotonic acids, as disclosed in the Whetstone and Stiles U.S. Patent No. 2,802,855. The patent teaches that the insecticides can be prepared by reacting the appropriate trialkyl phosphite with the appropriate N-alkyl or N,N-dialkyl-2-chloroacetoacetamides to form insecticides of the formula

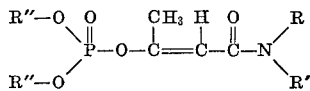

wherein R and R' are among other things hydrogen or alkyl, and both R'' substituents may be many organic radicals, including alkyl.

It is highly desirable that the above 2-chloroacetoacetamide reactants be substantially free of the 2,2-dichloro-acetoacetamide analogs, as the latter amides will also react with the trialkyl phosphite to form the unwanted chlorinated products

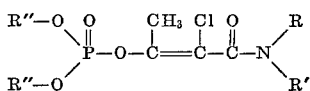

wherein R'', R' and R are as described above.

These pollutants are highly undesirable as they are inferior insecticides and exhibit higher toxicity to mammals in comparison to the analogous unchlorinated compounds.

Consequently, it is of great importance to prepare a substantially pure 2-chloroacetoacetamide precursor free of the 2,2-dichloro analog.

The above 2-chloroacetoacetamides are customarily prepared by chlorination of the corresponding aceto-acetamides. However, in the case of certain of these amides, for example, N-methylacetoacetamide, it has been found virtually impossible to prevent formation of substantial amounts of the corresponding 2,2-dichloroaceto-acetamides. For example, even by the most effective chlorination procedures known, 2-chloro-N-methylaceto-acetamide can be produced in a purity of only about 80% to 85% with 15% to 20% of the 2,2-dichloro pollutant also being formed. Due to the close similarity of the physical properties of the monochloro and dichloro products, physical separation is not commercially feasible.

Therefore, discovery of a process for selectively preparing N-alkyl- and N,N-dialkyl-2-chloroacetoacetamides substantially free of the 2,2-dichloro analog would be highly desirable.

Objects

It is an object of the invention to provide a process for the selective mono-chlorination of N-alkyl- and N,N-dialkylacetoacetamides to the corresponding 2-chloroacetoacetamides. It is a further object of the invention to provide a process for the selective mono-chlorination of the above amides in highly yields and purity. Another object of the invention is to provide a process for the mono-chlorination of the above amides while avoiding the formation of N-alkyl- or N,N-dialkyl-2,2-dichloroaceto-acetamides. Other objects will be apparent from the following detailed description of the invention.

Statement of the invention

The objects of the invention are accomplished in the preparation of N-alkyl- and N,N-dialkyl-2-chloroaceto-acetamides which comprises reacting N-alkyl- or N,N-dialkylacetoacetamide wherein the alkyl is up to 6 carbon atoms or hydrogen with chloral at elevated temperatures to form a chloral adduct of the formula

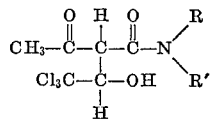

wherein R and R' are hydrogen or alkyl of 1 to 6 carbon atoms. The chloral adduct is then reacted with a chlorinating agent containing active chlorine at a temperature of between about 0° C. and 70° C. to form a second chloral adduct of the formula

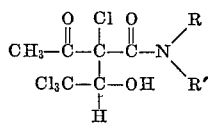

wherein R and R' are as described above.

The chlorinated chloral adduct is dissociated into chloral and N-alkyl- or N,N-dialkyl-2-chloroacetoaceta-mide simply by heating and separating the monochloro-amide therefrom.

The process of the invention may be represented by the equation:

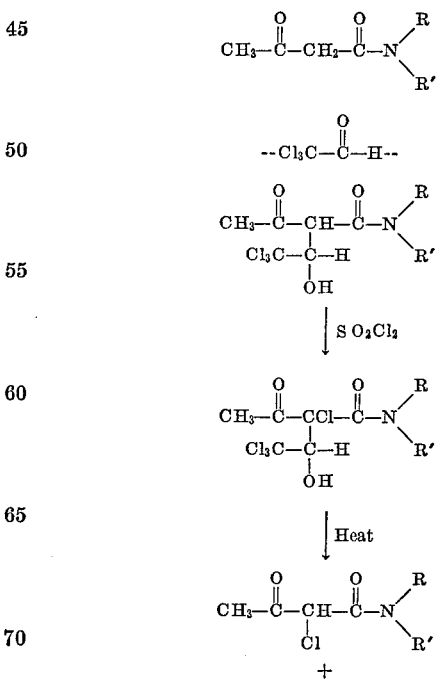

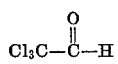

wherein R and R' are as described above.

Process

In order to facilitate full understanding of the invention, the process of the invention is set forth in more detail in the following description.

The process of the invention is conducted by reacting an N-alkyl- or N,N-dialkylacetoacetamide as described above with chloral, chlorinating the resultant chloral adduct, and then dissociating the chlorinated chloral adduct by heating and separating N-alkyl- or N,N-dialkyl-2-chloroacetoacetamide therefrom.

The acetoacetamide starting materials have the structural formula

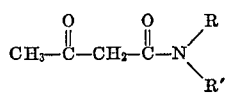

wherein R and R' may be hydrogen or alkyl of 1 to 6 carbon atoms. Examples of the amides wherein R is hydrogen or alkyl of 1 to 6 carbon atoms and R' is hydrogen include acetoacetamide
N-methylacetoacetamide
N-propylacetoacetamide
N-hexylacetoacetamide and the like.

Examples of the starting material wherein R and R' are alkyl of 1 to 6 carbon atoms include N,N-dimethylacetoacetamide
N-methyl-N-ethylacetoacetamide
N-ethyl-N-hexylacetoacetamide
N-sec-butyl-N-pentylacetoacetamide
N,N-dihexylacetoacetamide, and the like.

Some of the starting amides such as N-methylacetoacetamide are available commercially, and all of the above acetoacetamides may be synthesized by methods known in the art. For example, the Whetstore and Stiles Patent U.S. 2,802,855, issued Aug. 13, 1957, and the references therein teach a method for synthesis of the above acetoacetamides.

The chloral, which is available commercially, is reacted with the N-alkyl or N,N-dialkylacetoacetamide in an organic solvent which is inert under the reaction conditions, and in which the reactants are soluble enough to permit the reaction to proceed smoothly. The low solubility of the chloral adduct product in most solvents forces the reaction to completion by crystallizing out of the reaction medium as it is formed. However, a solvent which permits the reaction to proceed and in which the chloral adduct product is slightly soluble is also desirable as the subsequent chlorination step may then be carried out in the same reaction mixture.

Preferred solvents for the above chloral condensation and throughout the process are aromatic or aliphatic liquid hydrocarbons or halohydrocarbons which have a high boiling temperature. Examples of these solvents include carbon tetrachloride, 1,1,1-trichloroethane, chlorobenzene, chloroform, 1,1,2-trichloroethane, chlorobenzene, dichlorobenzene, trichlorobenzene, toluene, 1,2-dichloropropane, 1,4-dichlorobutane, methylcyclohexane, hexane, and their brominated analogs.

The chloral may be reacted with the acetoacetamide in a neutral solution or with the presence of an acid or base catalyst. The preferred catalysts are weak bases such as alkali metal salts and alkali earth metal salts of weak organic and inorganic acids such as potassium and sodium acetate and carbonate, dipotassium phosphate, borax, and sodium bicarbonate; ammonium salts of weak acids such as ammonium bicarbonate; and weak bases such as pyridine, and N,N-dimethylaniline. Such catalysts are used in concentrations of about 0.5 and 10 mole percent based on the moles of acetoacetamide starting material used. Especially preferred is a concentration of about 2 mole percent.

The presence of a mild base in the reaction medium appears to accelerate the chloral condensation reaction by at least a factor of 10. Suitable mild bases are the alkali metal and alkaline earth metal carbonates and acetates. Preferred among these bases are sodium carbonates and sodium acetate. The bases may be used in amounts of between about 0.005 to 0.1 molar based on the acetoacetamide starting material with about a 0.02 molar amount being preferred.

The solvent should be an anhydrous as possible since chloral will readily react with water, resulting in a net loss of chloral available for the condensation with the acetoacetamide. To avoid excessive losses of the chloral, water should not be present in the reaction mixtures in quantities greater than 5% by weight. Consequently, a slight molar excess of chloral may be advantageous in the condensation reaction.

The chloral condensation reaction may be carried out at subatmospheric, atmospheric pressures, or superatmospheric pressure, although atmospheric pressure is preferred. Temperatures of between about 0° C. to 125° C. are operable in the condensation reaction, although higher or lower temperatures may be used if advantageous. The preferred temperature range is between about 25° C. to 70° C.

The resulting chloral adduct solution may be directly chlorinated without any preliminary purification steps, or the adduct may be purified and then chlorinated. In the case where the reaction mixture is directly chlorinated the preferred solvents throughout the process are 1,2-dichloropropane, 1,1,2-trichloroethane and carbon tetrachloride.

When the chloral adduct product is purified before chlorination, any of the solvents discussed as useful in the condensation reaction are about equally useful. The purification may be carried out by procedures standard in the art such as crystallization, extraction, evaporation, or distillation of excess solvent and chloral, etc.

The resultant chloral adduct is chlorinated with a chlorinating agent in liquid phase at a temperature between about 0° C. to 70° C. to form the chlorinated chloral adduct. The reaction may be carried out at subatmospheric, atmospheric or superatmospheric pressure. The chlorination is generally mildly exothermic and is preferably carried out at a temperature between about 0° C. to 70° C. with a temperature of between about 15° C. and 35° C. being most preferred. Higher temperatures than the above-described should be avoided because reversion of the chloral adduct to the acetoacetamide and chloral may result. This would lead to over chlorination of the starting material which would yield the undesirable 2,2-dichloroacetoacetamide.

The solvents useful in the chlorination reaction are the same as those useful in the preceding condensation reaction. As explained above, the same reaction medium may be used for both the condensation and the chlorination reactions. Therefore, the above discussion of solvents for the condensation reaction is equally applicable for the chlorination reaction.

The suitable chlorinating agents for the above reaction are those compounds containing "active" chlorine, which is meant to define compounds which provide or are considered to provide chlorine in the cationic form as the chlorinium ion, $Cl^+$. Generally, these compounds are those in which chlorine is attached directly to an electronegative nitrogen, oxygen or sulfur atom.

Examples of these chlorinating agents include $Cl_2$, N- chloramide (monochlorammonia), N-chloro primary and secondary amines of the structure

wherein each R is hydrogen or an alkyl group of 1 to 10 carbon atoms of either straight chain or branched chain configuration such as N-chloro-N-methylamine, N-chloro-N,N-dibutylamine, N-chloro-N-pentyl - N - sec-butylamine, N-chloro-N,N-didecylamine, and the like.

Also included are the N-chloroacetamides of the structure

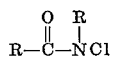

wherein R is hydrogen, or an alkyl group of 1 to 10 carbon atoms of branched or straight chain configuration such as N-chloroacetamide, N-chloro-N-propylacetamide, N-chloroacetylacetamide and N-chlorodecylacetamide.

Further examples include N - chlorosuccinamide, N-chlorosuccinimide, N-4-dichloro- and N-2,4-trichloroacetanilide, N-chlorophthalimide, mono- and di-chlorohydantoins, N-chloroformamide, and other compounds of the structure $$R'—C(O)N(X)_m(R'')_n$$

wherein X is chlorine, M is 1 or 2, $m+n$ is 2, and R' and R'' each may be hydrogen, an alkyl group of up to 10 carbon atoms, a phenyl unsubstituted or substituted by one or more of chlorine, nitro, cyano, and alkoxy wherein each alkyl group contains from 1 to 10 carbon atoms, and phenylalkyl wherein each alkyl group contains from 1 to 6 carbon atoms, or R' is of the structure

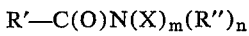

wherein X is chlorine, $p$ is 0, 1 or 2, and $p+q$ is 2, and R''' is an alkyl containing from 1 to 10 carbon atoms as in the ureas, such as N-chlorourea, N,N-dichlorurea, N-methyl-N'-chlorourea and the like; or R' is of the structure

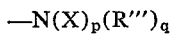

wherein R'''' is an alkyl of up to 10 carbon atoms as in the urethanes, for example, methyl-N-chlorourethane, ethyl-N-methyl-N-chlorourethane, propyl - N-methyl-N-chlorourethane, and the like.

Still further examples include hypochlorous acid and alkyl esters thereof wherein the alkyl contains from 1 to 20 carbon atoms; the mono-, di-, and trichloroisocyanurates of U.S. Patents Nos. 3,035,056 and 3,035,057; N,N - dichloro - azo - dicarbodiamidine, benzendiazonium perchloride, pyridine dichloride, N-substituted biguanides of U.S. Patent No. 2,945,061, sulfuryl chloride, sulfoxamides, sulfonamides, such as chloramine B and chloramine T, and N-chlorooxamides.

The above examples of chlorinating agents containing active chlorine are either commercially available such as chloramine T, or are readily prepared by methods known to the art, for example in the above-identified patents.

The preferred chlorinating agents are the N-chloro primary and secondary amines, the N-chloro-amides and imides, the N-chloro ureas, and sulfuryl chloride. The chlorinating agent may be pre-formed and added to the reaction mixture as is the case with sulfuryl chloride, or may be formed just before the reaction or may be formed in situ in the reaction mixture as in the case with the N-chlorourea.

The chlorinating agent should be present in the reaction or added during the reaction in equimolar amounts with the acetoacetamide starting material. A slight molar excess of chlorinating agent may be used in order to insure complete chlorination of the chloral adduct. Use of less than equimolar amounts of the chlorinating agent should be avoided as this results in a corresponding reduction in the chloral adduct that is chlorinated.

The chlorination reaction is slightly exothermic. Therefore, to insure control of the reaction and to avoid excessive temperatures the chlorinating agent is added slowly during the reaction. Further control of the amount of heat given off by the reaction can be obtained by mixing the chlorinating agent with one of the above solvents. The rate of reaction appears to be benefited by rapid stirring of the reaction mixture since this allows the quick addition of the chlorinating agent by increasing contact of the chlorinating agent with the partially solubilized adduct.

Most of the chlorinated chloral adduct will crystallize out of the reaction solution in some solvents to the extent that only about 10% of the chlorinated product will remain in solution. Since the chlorinated chloral adduct will not react with active chlorine compounds under the chlorination reaction conditions, the precipitate may be filtered out of the solution, and the mother liquor may be reused as the solvent in the chlorination reaction.

The chlorinated chloral adduct is then dissociated to the 2-chloroacetoacetamide and chloral by subjecting it to temperatures of about 15° C. to 200° C. and the 2-chloroacetoacetamide is separated out of the reaction mixture.

The dissociation reaction may be carried out in the same reaction mixture used for the condensation and chlorination reactions. This would result in a continuous one-pot process for the multi-step process of the invention for the synthesis of the 2-chloroacetoacetamides described above.

However, it may be more advantageous to run the condensation and chlorination reactions in the same solvent, filter off the resulting crystallized chlorinated chloral adduct, and dissociating the adduct separately. The separation procedure removes the pure chlorinated adduct from the reaction mixture which may contain impurities that will decrease the efficiency of the dissociation reaction process. For example, any excess sulfuryl chloride would be removed with the mother liquor Otherwise, any sulfuryl chloride present during the dissociation reaction would react with the desired 2-chloroacetoacetamide to form the unwanted 2-2-dichloroacetoacetamide.

The chlorinated chloral adduct may be dissociated by heating it above its melting point under vcauum. However, a cleaner product is obtained more rapidly by the use of a diluent. Suitable diluents are those solvents discussed above for the condensation reaction. The rate of dissociation increases with temperature, therefore, the higher boiling solvents are preferred. For example, the dissociation required 5 hours of reflux of the adduct in 1,2-dichloroethane (boiling point 84° C.) whereas only 2 hours was needed with 1,2-dichloropropane as a solvent (96° C.) and only 0.5 hour of refluxing in 1,1,2-trichloroethane (boiling point 114° C.) completed the dissociation.

A convenient procedure for dissociating the adduct is to reflux the adduct with a solvent in a ratio of one part adduct by weight to two volumes solvent for a time sufficient for complete dissociation, which will depend on the particular solvent employed. The dissociation may be carried out in an essentially neutral solution; however, the rate of dissociation can be accelerated at least a hundredfold by the presence of weak bases such as those discussed above for the condensation reaction.

Further, the presence of weak bases allows the dissociation to be performed at lower temperatures. As in the condensation reaction, the amount of basic catalyst required varies from 0.005 molar to 0.1 molar based upon the moles of adduct being reacted.

An alternate procedure for the dissociation reaction is heating a slurry of the chlorinated chloral adduct in water to a temperature between about 10° C. to 50° C. in the presence of a weak base. The dissociation proceeds rapidly and is complete in several minutes. The desired 2-chloroacetoacetamide and chloral hydrate are the products of this method.

Once the dissociation is completed, the desired monochlorinated product is recovered from the reaction mixture by methods well known to the art. For example, the reaction mixture may be cooled and the chlorinated amide separated out by selective phase separation. Other methods include azeotropic distillation of excess chloral with cyclohexane, distillation in vacuo, crystallization and the like.

2-chloroacetoacetamide products of the process of the invention are of the structure

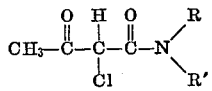

wherein R and R' each may be hydrogen or alkyl of 1 to 6 carbon atoms. Examples of the amides wherein R is hydrogen or alkyl of 1 to 6 carbon atoms and R' is hydrogen includes 2-chloroacetoacetamide
N-methyl-2-chloroacetoacetamide
N-butyl-2-chloroacetoacetamide
N-n-propyl-2-chloroacetoacetamide
N-hexyl-2-chloroacetoacetamide and the like.

Examples of the product wherein R and R' are alkyl of 1 to 6 carbon atoms include N,N-dimethyl-2-chloroacetoacetamide
N,ethyl-N-sec-butyl-2-chloroacetoacetamide
N-n-propyl-N-pentyl-2-chloroacetoacetamide
N,N-dihexyl-2-chloroacetoacetamide and the like.

As N-methyl-2-chloroacetoacetamide is the preferred product of this process, the following examples will be discussed in terms of N-methylacetoacetamide as a starting material and 2-chloro-N-methylacetoacetamide as the product of the invention.

The examples demonstrate that the process of the invention produced 2-chloro-N-methylacetoacetamide in crude yields in excess of 90% with a purity of up to 95% and free of any undesirable 2,2-dichloroacetoacetamide. This high purity and high yield of N-chloromethylacetoacetamide and the absence of unwanted impurities make the process of the invention highly desirable for the synthesis of 2-chloro-N-methylacetoacetamide for used as an intermediate in the above described synthesis of phosphate insecticides.

The novel and useful features of the process of the invention are illustrated by the following examples. In the examples, the proportions are given in parts by weight unless otherwise noted.

EXAMPLE I

A slurry of 23 g. (0.2 mole) of N-methylacetoacetamide and 31 g. (0.21 mole) of freshly distilled chloral in 200 ml. of carbon tetrachloride was stirred and refluxed for 3 hours and allowed to stand overnight at room temperature. The solid product was filtered and washed with fresh solvent to give 50 g. (95%) of N-methyl-2-(1-hydroxy-2,2,2-trichloroethyl)-acetoacetamide.

Analysis for $C_7H_{10}Cl_3NO_3$. Calculated: Cl, 40.6; N, 5.3. Found: Cl, 40.4; N, 5.2.

EXAMPLE II

To a stirred slurry of 131 g. (0.5 mole) of N-methyl-2-(1-hydroxy-2,2,2-trichloroethyl)-acetoacetamide in 800 ml. of methylene chloride was added 74 g. (0.5 mole) of sulfuryl chloride over a period of about 0.25 hour at 25°. After being stirred for another 2.5 hours at 25° the slurry was cooled to 5° and was filtered to give 130 g. (88%) of N-methyl-2-(1-hydroxy-2,2,2-trichloroethyl)-2-chloroacetoacetamide.

Analysis for $C_7H_9Cl_4NO_3$. Calculated: Cl, 47.8; N, 4.7. Found: Cl, 47.8; N, 4.5.

EXAMPLE III

A mixture of 31 g. (0.21 mole) of freshly distilled chloral and 23 g. (0.2 mole) of N-methylacetoacetamide in 200 ml. of carbon tetrachloride was stirred and refluxed for 2.5 hours. The mixture was allowed to stand overnight at room temperature and, after dilution with 100 ml. of carbon tetrachloride, was treated with 30 g. (0.22 mole) of sulfuryl chloride at 25°. The slurry was stirred for 2 hours, was cooled to 10° and was filtered to give 56 g. (93%) of the chlorinated-chloral adduct. A solution of this solid in 100 ml. of 1,1,2-trichloroethane was refluxed for one hour. The solution was decanted from a small amount of insoluble oil and was evaporated, finally at 80° (0.3 mm.), to leave 28 g. (93%) of tan solid, containing less than 2% chloral by gas chromatography. Iodide titration indicated the presence of 94.7% N-methyl-2-chloroacetoacetamide.

EXAMPLE IV

Following the procedure outlined in Exampl eI, several runs were made illustrating Step 1 of the invention, i.e., the condensation of chloral with the acetoacetamide. In each run, the amide was N-methylacetoacetamide. The various solvents, times and temperatures employed, as well as the yields and chlorine analyses, are given in Table I. Calculated analysis for chlorine is 40.6%.

TABLE I

| Amide,[1] moles | Chloral,[2] moles | Solvent | Vol., ml | Time, hours | Temp., °C. | Yield,[3] percent | Anal. percent Cl |
|---|---|---|---|---|---|---|---|
| 0.29 | 0.35 | CHCl₃ | 100 | 4 | 65 | 77 | |
| 0.9 | 0.94 | CHCl₃ | 300 | 6 | 65 | 74 | 39.0 |
| 0.3 | [4] 0.31 | CHCl₃ | 100 | [5] 6 | 65 | 76 | 40.5 |
| 0.29 | 0.31 | CHCl₃ | 100 | [5] 0.5 | 65 | 37 | 40.0 |
| [6] 1.0 | [4] 1.05 | CHCl₃ | 350 | 2 | 65 | 84 | 40.5 |
| 0.29 | 0.35 | CCl₄ | 200 | [5] 1 | 78 | 93 | 39.6 |
| 1.0 | 1.18 | CCl₄ | 700 | 2.5 | 78 | 93 | 39.8 |
| 0.2 | 0.21 | CCl₄ | 200 | 3 | 78 | 91 | 39.0 |
| 0.2 | [4] 0.21 | CCl₄ | 200 | [5] 2.5 | 78 | 95 | 40.4 |
| 0.2 | [4] 0.204 | CH₂ClCHCl₂ | 50 | 6.5 | 70 | 85 | |
| 0.2 | [4] 0.204 | CH₂ClCHCl₂ | 50 | [5] 7.5 | 70 | 88 | 40.3 |
| 0.2 | [4] 0.204 | C₆H₁₁CH₃ | 200 | 5 | 70 | 95 | 38.8 |
| 1.0 | [4] 1.05 | C₆H₅Cl | 500 | 5 | 70 | 78 | 40.5 |
| 1.1 | 0.105 | CH₃CHClCH₂Cl | 30 | (*) | 25 | 81 | 40.3 |

[1] Molecular weight=115.
[2] Molecular weight=147.5 (commercial grade employed, unless otherwise noted).
[3] Yield base on weight of solid crystallizing from reaction mixture.
[4] Redistilled from commercial grade material.
[5] Let stand overnight at room temperature after heating.
[6] Sodium carbonate (0.07 mole) added as catalyst.
*4 days.

EXAMPLE V

Following the procedure outlined in Example II, several runs were made using sulfuryl chloride as a chlorinating agent for the chlorination of N-methyl-2-(1-hydroxy-2,2,2-trichloroethyl)-acetoacetamide, the chloral adduct of Step 1 of the invention. The results and reaction conditions are given below in Table II.

TABLE II

| Adduct,[1] moles | SO$_2$Cl$_2$, moles | Solvent | Vol., ml. | Yield,[2] percent | Anal.,[3] percent Cl |
|---|---|---|---|---|---|
| 0.18 | 0.18 | CH$_2$Cl$_2$ | 500 | 75 | 47.8 |
| 0.15 | 0.15 | CH$_2$Cl$_2$ | 250 | 82 | |
| 0.25 | 0.25 | CH$_2$Cl$_2$ | 300 | 82 | |
| 0.5 | 0.5 | CH$_2$Cl$_2$ | 800 | 88 | 47.8 |
| [4] 0.5 | 0.55 | CH$_2$Cl$_2$ | 1,500 | 75 | 46.3 |
| [4] 0.35 | 0.37 | CH$_2$Cl$_2$ | 560 | 93 | 46.8 |
| [4] 0.27 | 0.27 | CCl$_4$ | 600 | 90 | 45.3 |

[1] Molecular weight=262.5.
[2] Yield based on weight of solid filtered from reaction mixture; product was N-methyl-2-(1-hydroxy-2,2,2-trichloroethyl)-2-chloroacetoacetamide, molecular weight=297.
[3] Calculated analysis for chlorine is 47.8%.
[4] Prepared in carbon tetrachloride.

EXAMPLE VI

Following the procedure of Examples I, II and III, a number of runs were made to illustrate the conversion of N-methylacetoacetamide with all three steps of the invention combined. Reaction conditions and results are given in Table III.

TABLE III

| MMAA,[1] moles | Chloral,[2] moles | Solvent | Vol. (ml.) | Time, hours | Temp., °C. | SO$_2$Cl$_2$, moles | Chlorination Solvent | Vol. (ml.) | Dissociation[3] Solvent | Vol. (ml.) | Yield[4] Crude MMCAA[5] (4) | Content of MMCAA[5] in Crude Product, percent[6] |
|---|---|---|---|---|---|---|---|---|---|---|---|---|
| 0.1 | [7] 0.105 | CCl$_4$ | 40 | 6 | 40–50 | 0.1 | Same+ | 40 | Same+TCE | 45 | 102 | 84[4] |
| 0.2 | 0.21 | CCl$_4$ | 200 | [8] 2.5 | 78 | 0.19 | TCE | 100 | Same | | 97 | [9] 91 |
| 0.2 | 0.21 | CCl$_4$ | 200 | [8] 2.5 | 78 | 0.22 | Same+ | 100 | TCE | 100 | 93 | [9] 95 |
| 0.2 | 0.21 | CCl$_4$ | 200 | [8] 3 | 78 | 0.22 | Same | | TCE | 100 | 94 | [9] 93 |
| 0.2 | 0.21 | CCl$_4$ | 200 | 3 | 78 | 0.22 | Same | | TCE | 100 | 86 | |
| 0.2 | 0.21 | CCl$_4$ | 200 | 1 | 78 | 0.22 | Same | | TCE | 100 | | |
| 0.2 | [7] 0.21 | CCl$_4$ | 200 | 3 | 78 | 0.22 | Same | | TCE | 100 | 80 | 85 |
| 0.2 | [7] 0.21 | CCl$_4$ | 200 | 3 | 78 | 0.18 | TCE | 100 | Same | | 87 | 77 |
| 0.2 | [7] 0.21 | CCl$_4$ | 200 | 3 | 78 | 0.22 | CCl$_4$ | 200 | TCE | 100 | 73 | 85 |
| 0.2 | 0.204 | TCE | 50 | [8] 6.5 | 80 | 0.22 | Same | | TCE | 100 | 84 | 95 |
| 0.1 | [7] 0.15 | TCE | 20 | 2 | 90 | 0.1 | Same | | Same | | | |
| 0.1 | [7] 0.2 | TCE | 30 | 2 | 90 | 0.1 | Same | | Same | | | |
| 0.1 | [7] 0.105 | TCE | 30 | 6 | 50 | 0.1 | Same | | Same | | | |
| 0.2 | 0.204 | C$_6$H$_5$Cl | 100 | 3.5 | 70–80 | 0.22 | Same | | C$_6$H$_5$Cl | 100 | 80 | 93 |
| 0.2 | 0.21 | C$_6$H$_{14}$ | 200 | [8] 3 | 70 | 0.22 | Same | | TCE | 100 | [10] 128 | 14 |
| [11] 0.1 | | | | | | 0.11 | CCl$_4$ | 60 | TCE | 45 | 94 | 92 |
| [11] 0.1 | | | | | | 0.1 | TCE | 45 | Same | | 100 | 95 |

[1] Molecular weight=115; MMAA=monomethylacetoacetamide (N-methylacetoacetamide).
[2] Redistilled (molecular weight=147.5).
[3] Heated at 110° C. for 1-2 hours. TCE=1,1,2-trichloroethane.
[4] Weight yield, stripped to 80° C. (0.5 mm. pressure); molecular weight=149.5.
[5] MMCAA=monomethylchloroacetoacetamide (N-methyl-2-chloroacetoacetamide).
[6] By iodide titration.
[7] Not redistilled.
[8] Also, overnight at room temperature.
[9] Overall yield of 88%.
[10] Crude product mostly N-methyl-2-(1-hydroxy-2,2,2-trichloroethyl)-2-chloroacetoacetamide.
[11] N-methyl-2-(-1-hydroxy-2,2,2-trichloroethyl)-acetoacetamide prepared in chloroform.

We claim as our invention:

1. A process comprising
(1) reacting an amide of the formula

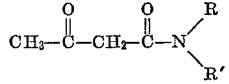

wherein R and R' are selected from the group consisting of hydrogen and alkyl of 1 to 6 carbon atoms, with chloral at a temperature between about 0–125° C. in liquid phase in the presence of an anhydrous solvent to form a chloral adduct of the formula

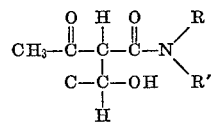

wherein R and R' are as described above;
(2) reacting the chloral adduct with a mixture of at least an equimolar amount of a chlorinating agent containing active chlorine in liquid phase at a temperature between about 0° C. to 70° C. to form a second chloral adduct of the formula

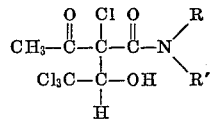

wherein R and R' are as described above; and
(3) dissociating the chlorinated chloral adduct by heating the adduct to a temperature between about 15° C. to 200° C. and separating therefrom a monochloroacetoacetamide of the formula

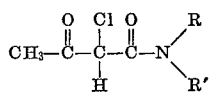

wherein R and R' are as described above.

2. The process of claim 1 wherein the acetoacetamide is reacted with chloral in liquid phase in the presence of a weak base.

3. The process of claim 1 wherein the acetoacetamide is reacted with chloral in liquid phase in the presence of a weak base selected from the group of sodium carbonate and sodium acetate.

4. The process of claim 2 wherein the base is present in an amount between about 0.005 and 0.1 molar based on the moles of the amide being reacted.

5. The process of claim 1 wherein the chloral adduct and chlorinating agent are reacted at a temperature of between about 15° C. and 35° C.

6. The process of claim 1 wherein the chlorinated chloral adduct is dissociated in liquid phase in the presence of a weak base.

7. The process of claim 6 wherein the dissociation in liquid phase is carried out in the presence of a weak base selected from the group of sodium bicarbonate and sodium acetate.

8. The process of claim 7 wherein the base is present in an amount between about 0.005 and 0.1 molar based on the moles of the adduct being dissociated.

9. The process of claim 1 wherein the dissociation reaction is carried out by heating the chlorinated chloral adduct above its melting point under vacuum.

10. The process of claim 1 wherein the dissociation is carried out at a temperature of between about 50° C. and 125° C.

11. The process of claim 1 wherein the chlorinating agent is sulfuryl chloride.

12. The process of claim 1 wherein the chlorinating agent is $Cl_2$.

13. The process of claim 1 wherein the final product is N-methyl-2-chloroacetoacetamide.

14. The process of claim 1 wherein the final product is N,N-dimethyl-2-chloroacetoacetamide.

References Cited

UNITED STATES PATENTS 3,284,500  11/1966  Tieman _____ 260—561

ALEX MAZEL, Primary Examiner

J. A. NARCAVAGE, Assistant Examiner